US012399464B2

(12) United States Patent
Moyse et al.

(10) Patent No.: US 12,399,464 B2
(45) Date of Patent: Aug. 26, 2025

(54) MECHANICAL STOP AND START SYSTEM FOR A FUNCTION, AND WATCH COMPRISING SUCH A SYSTEM

(71) Applicant: RICHEMONT INTERNATIONAL SA, Villars-sur-Glâne (CH)

(72) Inventors: Romain Moyse, Montlebon (FR); Kéwin Bas, Villers-le-lac (FR)

(73) Assignee: RICHEMONT INTERNATIONAL SA, Villars-sur-Glâne (CH)

( * ) Notice: Subject to any disclaimer, the term of this patent is extended or adjusted under 35 U.S.C. 154(b) by 413 days.

(21) Appl. No.: 17/911,913

(22) PCT Filed: Mar. 10, 2021

(86) PCT No.: PCT/EP2021/056102
§ 371 (c)(1),
(2) Date: Sep. 15, 2022

(87) PCT Pub. No.: WO2021/185655
PCT Pub. Date: Sep. 23, 2021

(65) Prior Publication Data

US 2023/0139184 A1 May 4, 2023

(30) Foreign Application Priority Data

Mar. 20, 2020 (CH) .................................... 00340/20

(51) Int. Cl.
*G04F 7/06* (2006.01)

(52) U.S. Cl.
CPC .................................... *G04F 7/065* (2013.01)

(58) Field of Classification Search
CPC ..... G04F 1/04; G04F 1/08; G04F 7/00; G04F 7/02; G04F 7/065; G04B 17/02
See application file for complete search history.

(56) References Cited

U.S. PATENT DOCUMENTS

| | | | | |
|---|---|---|---|---|
| 3,021,666 A * | 2/1962 | Walter | G04F 3/02 368/97 |
| 3,541,781 A | 11/1970 | Bloom | |
| 3,948,037 A | 4/1976 | Carlone | |
| 8,179,744 B2 * | 5/2012 | Laucella | G04B 19/02 368/110 |
| 10,037,010 B2 * | 7/2018 | Legeret | G04F 7/0847 |
| 10,468,215 B2 * | 11/2019 | Lenoir | H01H 36/0073 |

FOREIGN PATENT DOCUMENTS

| | | |
|---|---|---|
| CH | 4882 | 9/1892 |
| CH | 712372 | 10/2017 |

* cited by examiner

*Primary Examiner* — Edwin A. Leon
*Assistant Examiner* — Jason M Collins
(74) *Attorney, Agent, or Firm* — DUANE MORRIS LLP; Gregory M. Lefkowitz

(57) ABSTRACT

A mechanical stop and start system for a function of a timepiece, including a mass, mounted so as to be able to move on a frame, between a first and a second end position, which are defined respectively by a first stop and a second stop. The mass portion moves in a bistable manner, under the effect of gravity, tensioning a spring between the first and second end positions, and relaxing the spring between the second and first end positions.

14 Claims, 2 Drawing Sheets

MECHANICAL STOP AND START SYSTEM FOR A FUNCTION, AND WATCH COMPRISING SUCH A SYSTEM

CROSS-REFERENCE TO RELATED APPLICATIONS

This application is a § 371 national stage entry of International Application No. PCT/EP2021/056102, filed Mar. 10, 2021, which claims priority to Swiss Patent Application No. 00340/20, filed Mar. 20, 2020, the entire contents of which are incorporated herein by reference.

TECHNICAL FIELD

The present invention relates to the field of timepieces and relates to a mechanical system for stopping and starting a function. The expression "starting a function" is defined as the transfer of the function from an initial rest state to a second, active state, and the expression "stopping a function" is defined as the reverse transfer from the active state to the rest state.

PRIOR ART

In the field of mechanical timepieces, functions that have rest or stopped states and operating states are known. For example, this is the case with a chronograph, or with a minute repeater, which are actuated by pushbuttons or by a trigger piece. Some functions are likewise commanded automatically by complex triggering systems, as is also the case for hour-striking mechanisms or alarm mechanisms.

The document U.S. Pat. No. 3,541,781 discloses a mechanism making it possible to detect whether a wearer is standing up or sitting down and to measure the time spent in these positions. A lever is mounted so as to be freely rotatable, and, solely under the effect of its weight and depending on the position of the device, blocks or liberates an escape wheel of a counting geartrain. However, this mechanism is not very precise and the device positions in which the measurement starts or stops are not defined.

The aim of the present invention is to propose a command mechanism for a function, which can be used in a mechanical watch, that is to say a watch that does not use electronic or electric elements, and which at least partially overcomes the drawbacks of the prior art.

DISCLOSURE OF THE INVENTION

More specifically, the invention relates to a mechanical system for stopping and starting a function of a timepiece, comprising a mass, movably mounted on a frame between a first and a second extreme position, respectively defined by a first and a second stop, said mass being displaced, under the effect of gravity, thereby loading a spring between the first and second extreme positions, and thereby relaxing said spring between the second and first extreme positions, said mass being kinematically or directly connected to a control member for said function.

The mass and the force of the spring are determined as a function of the force required to command said function and to displace the control member, and of the predetermined spatial orientations of the frame in which the mass is bi-stably displaced from one to the other of its extreme positions, depending on the resultant of the forces exerted by the spring and by gravity, the displacement of the mass from the first extreme position to the second extreme position being able to start or stop said function via the control member, and the displacement of the mass from the second extreme position to the first extreme position being respectively able to stop or start said function via the control member.

This definition of the invention extends to a command system for commanding a function of a timepiece, able to occupy a first state and a second state, in particular an animation.

According to another aspect, the invention likewise relates to a watch comprising such a stopping and starting system.

BRIEF DESCRIPTION OF THE DRAWINGS

Other details of the invention will become more clearly apparent upon reading the following description, in reference to the appended drawing, in which.

EMBODIMENT OF THE INVENTION

Figure 1:
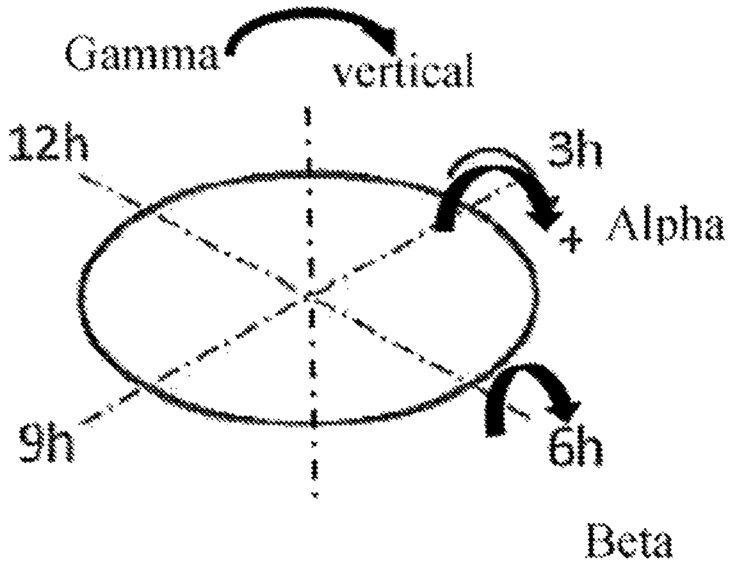
FIG. 1 shows a definition chosen for the axes of rotation to which a watch may be subject when worn.

The aim of the present invention is to propose a mechanical switch making it possible to start and stop a function, on command, but with no direct mechanical action or pressure applied to the switch. More specifically, the stopping and starting system according to the invention makes it possible to start and stop the function depending on the spatial orientation of the system and therefore of the watch in which it is incorporated. As will be understood below, various dimensionings are possible, but a preferred embodiment is to dimension and arrange the system according to the invention such that the function starts when the wearer makes the usual movement for reading the time when the watch is on their wrist and the function stops when they rotate the wrist, for example to return their arm to a more vertical position.

More particularly, the system for stopping and starting a function according to the invention comprises a mass, of the oscillating mass type, that is movably mounted on a watch frame between a first and a second extreme position. These latter are defined respectively by a first and a second stop, which may be elastic in order to cushion shocks.

A spring is connected to the mass. The connection between the spring and the mass is preferably direct, such that the displacements of the mass have a direct effect on the winding-up of the spring. More particularly, when the mass is displaced under the effect of gravity, following a movement on the part of the wearer which sets it in motion, the spring is arranged so as to be loaded by the mass as it is displaced between the first and the second extreme positions. Conversely, as the mass is displaced between the second and the first extreme positions, the spring relaxes and, the case being, restitutes the stored energy to the mass, against the action of gravity.

The mass is kinematically or directly connected to a control member for said function. Advantageously, the connection between the mass and the control member is desmodromic. This connection may be of the meshing type with a pinion or a rack borne by the mass and meshing with the control member. The mass may likewise directly bear a magnet which can magnetically control, for example functions of the visual animation type, as will be described in detail below.

The mass (of the mass) and also the force of the spring are determined as a function of the force required to command said function and displace the control member. The system is likewise dimensioned as a function of the predetermined angular orientations of the watch, in which the mass is displaced from one to the other of its extreme positions depending on the resultant of the forces exerted by the spring and by gravity, the displacement of the mass from one to the other of said extreme positions engendering respectively the starting or stopping of said function via the control member.

In other words, in a first step the force or the torque required to respectively start or stop the function (to pivot shuttles or a column wheel of a chronograph, actuate a trigger lever, displace a magnet, . . . ), is determined.

The orientations of the watch in which it is desired for the function to be respectively started or stopped, are likewise determined. In a preferred embodiment, it is determined that the function is started when the wearer raises the watch to look at it, in a reading position. As can be seen in FIG. 1, the angle alpha is defined as the angle of rotation about the axis 9H-3H, the angle beta is defined as the angle of rotation about the axis 12H-6H, and the axis gamma is defined as the angle of rotation about the orthogonal axis passing through the center of the dial. These three angles are zero when the watch is placed horizontally, facing the wearer, with the axis 9H-3H roughly parallel to the line of the shoulders. In the conventional position for reading the time, in which it is desired to start the function, the following applies: Alpha is between 30-35°, Beta=0°, Gamma=0°.

It is preferable, but not obligatory, for it to also be desired to stop the function in a position of rotation of the wrist that differs from the preceding position. The risk of unintentional alternation between stoppages and start-ups around a sole orientation is thus limited. The stop orientation is preferably defined for Alpha between 15-18°, Beta=0°, Gamma=0°. It will be noted that the stop orientation preferably differs from the neutral orientation of the starting point taken into consideration for the start-up (in which Alpha=0°, Beta=0°, Gamma=0°). It is possible to take advantage of this hysteresis in the calculation of the spring, in order to differentiate between the orientations of the watch that are used to respectively start and stop the function. This differentiation makes it possible to avoid unintentional alternations between start-up and stoppage, which could possibly occur if the watch were to oscillate about a sole triggering and stopping position.

On the basis of these factors, the travel of the mass and the weight (of the mass) are determined so as to generate the torque required.

However, it is also necessary to dimension both the stiffness and the preloading of the spring. Its function is to keep the mass in abutment in its first extreme position, against the action of gravity, provided that the watch has not been placed in the corresponding orientation. Beyond this orientation, the force exerted by gravity is greater than the force exerted by the spring, and the mass is displaced, thereby starting the function. The spring likewise has the function, when the mass is in abutment in its second extreme position, of bringing the mass into its first extreme position when the force exerted by gravity becomes smaller than the force exerted by the spring. The mass then stops the function.

The dimensioning and the calculations of the mass, and of the characteristics of the spring, are within the scope of a person skilled in the art, without having to describe them in detail. To obtain the expected result, there are multiple solutions for parameters, for example with a heavier mass, and a stronger spring, the system can be triggered and stopped depending on the specifications required.

It is also possible to use an unbalanced mass mounted movably in rotation, similar to an oscillating mass for automatic rewinding, some of which operate with a limited angular travel. In this case, the unbalance, which includes the eccentricity of the mass, which has an effect on the torque supplied, is taken into account. However, the mass may likewise have a linear or complex trajectory.

A start-up orientation and a stoppage orientation are predetermined in this way. The mass is of the bi-stable type and is held in its first extreme position provided that the watch has not moved through the start-up orientation, and is held in its second extreme position provided that the watch has not moved through the stoppage orientation.

Unlike the present invention, an oscillating mass for an automatic rewinder does not make it possible to stop the rewinding function. In any case, even if it were necessary to consider that, in some positions of the mass, in particular when it has stopped, there is no rewinding of the barrel, the rewinding and non-rewinding positions are not predefined and do not correspond to specific spatial orientations of the watch.

In order to reduce the shocks linked to the displacements of the mass and to the interactions with the stops, the mass can be connected to a speed regulator. This latter may be an escapement, for example a frictional rest escapement as is used in some striking mechanisms, or a centrifugal inertial brake, also of the type used in striking mechanisms. It is also possible to use a magnetic or oil-bath-based braking device.

To offer the user the possibility of shunting the switch and moving the watch without triggering the function, a blocking device for blocking the mass may be provided. This device is advantageously accessible from the outside of the watch. It may consist of a pushbutton or a bolt interacting directly or indirectly with the mass to block its movements, preferably in one of its extreme positions.

The system according to the invention may be arranged in the form of an independent module, comprising its own frame and mounted on a base movement. The mechanism or the components making it possible to perform the function to be commanded can likewise be arranged on the frame or be disposed on the base movement. In this case, a kinematic connection or another type of connection, for example a magnetic connection, will be provided between the module and the base movement.

The system according to the invention can be used to command, that is to say start and stop, a function for which the mechanism that allows it to be performed is arranged in the watch.

An example of a function that can be controlled by the system according to the invention is a visual animation. The visual animation can be mechanically commanded, for example by releasing or blocking a barrel, when the mass is respectively in its first or in its second extreme position. This barrel may drive a Jacque-mart-type automaton, typically by driving a cam against which a movable element is kept pressed. By mounting a magnet on the mass or by having a magnet driven by the mass, this magnet can drive the displacement of a paramagnetic or diamagnetic movable element able to react to the displacement of the magnet by being displaced itself. This displacement can be guided, via the mounting of said movable element, for example in rotation or on a guide rail.

Figure 2:
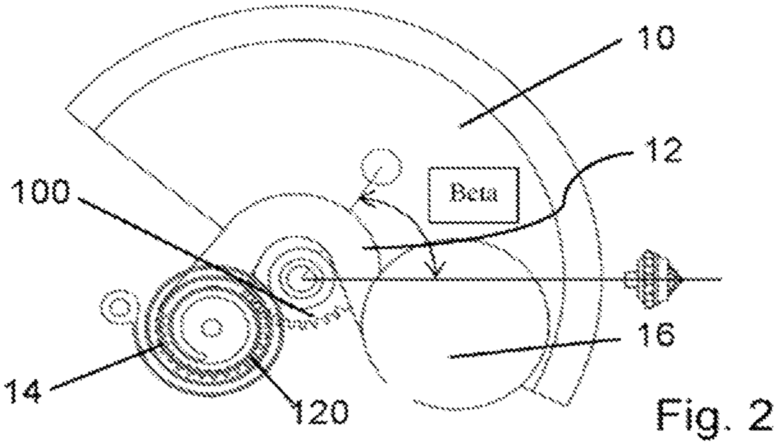
FIG. 2 and FIG. 4 are views of the stopping and starting system according to a particular embodiment, in respectively a first extreme position and a second extreme position.

FIG. 2 shows an example of a particular embodiment of a starting and stopping system according to the invention. According to this example, the function to be commanded is an animation, controlled by the movement of a magnet.

The mass is an oscillating mass mounted movably in rotation10. It is equipped with a toothing 100 that is in engagement with a toothing 120 integral with the control member, which takes the form of a lever 12, mounted so as to be able to pivot on the frame of the module or of the timepiece. The toothing 100 and 120 are advantageously incomplete, that is to say that they are disposed over a toothed sector less than 360°, given that the oscillating mass 10 is limited in its rotation between its two extreme positions by two stops, which are not shown. In the exemplary embodiment, the stepdown ratio between the teeth is set equal to −1.

The spring 14 is of helical type, acting on the control member, at the axis of rotation of the lever in this example, via a first one of its ends. The other end is fixed to the frame.

At its end opposite to its axis of rotation, the lever 12 bears a magnet 16. This latter acts on a magnetic element which is movable, for example displaceable above the dial, so as to be visible to a user while the starting and stopping system is hidden below the dial.

When the watch is in a horizontal position, gravity acts parallel to the axis of rotation of the mass. As a result, the unbalance of the mass does not generate any torque at the axis.

Moreover, the spring 14 is preloaded, in the clockwise direction in this example. The spring 14 will therefore apply a torque in the clockwise direction to the lever, transmitting to the oscillating mass 10, via the meshing connection, a torque tending to make it pivot in the counter-clockwise direction. However, in this position, the oscillating mass 10 is in its first extreme position, against a stop referred to as upper stop (not shown in the drawing). The system is thus in equilibrium in a first stable position. The magnetic element positioned by the magnet is likewise in a first stable position. In this first position, it can be hidden behind a cover so as not to be visible to the wearer.

Figure 3:
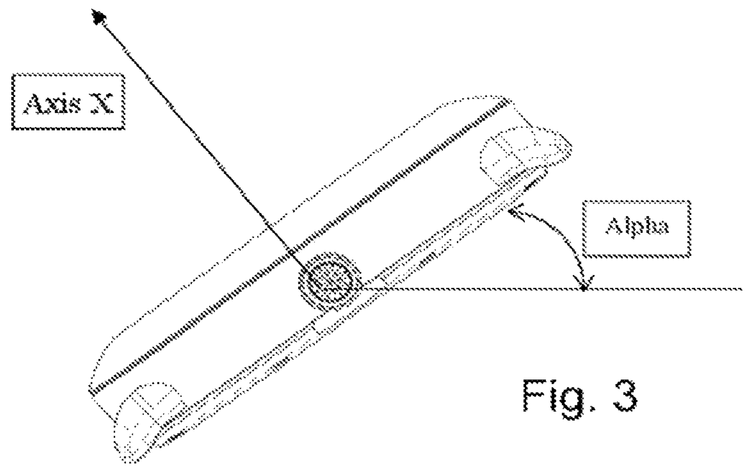
FIG. 3 shows a watch comprising a system according to the invention, to establish the position of the reference axes and angles.

When the wearer of the watch rotates it about the axis 9H-3H (FIG. 3) by an angle alpha, the torque generated by gravity on the mass at the axis X increases gradually in accordance with the following formula:

$$\text{Torque of mass}=d*m*\text{gravity}*\text{sine(alpha)}*\text{cosine (beta)}$$

with Beta being the angle (with a sign in accordance with trigonometry rules) of the center of mass with respect to the axis 9*h*-3*h* (FIG. 2).

The torque of the return spring (taken at the center of rotation of the mass) is constant while Beta stays the same, and its value is as follows:

$$\text{Torque of spring}=-K*(\text{Theta0}+\text{Beta0}-\text{Beta})$$

with Beta® being the angle Beta when the mass is in its first stable position.

There is also a resistive torque for transferring the function from a stopped state to a started state. This torque will be considered to be constant in this example (having the value Cresistif) and opposite to the displacement direction.

The equilibrium of the torques applied to the mass is therefore:

$$C=d*m*\text{gravity}*\text{sine(alpha)}*\text{cosine(beta)}-K*(\text{Theta0}+\text{Beta0}-\text{Beta})-\text{Cresistif}$$

While this torque is negative, the mass tends to revolve in the counter-clockwise direction and therefore remains in abutment, in the first stable position.

This torque becomes positive when sine (Alpha) becomes greater than (beta=beta0): sine (alpha0)>(K*(Theta0)+Cresistif)/(d*m*gravity*cosine (beta0)).

The angle at which the torque becomes positive is denoted as Alpha0.

Figure 4:
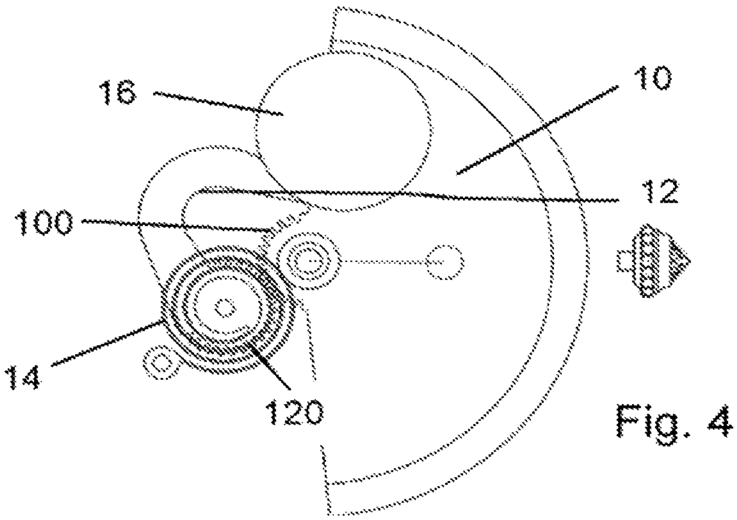

Once the resultant of the torques applied to the oscillating mass 10 has become positive, the torque generated by gravity will be larger than the resistive torque of the function and of the return spring. The mass will therefore pivot about its axis in the clockwise direction (Beta will decrease). The oscillating mass 10 will move as long as it has not reached its second extreme position (FIG. 4), against a stop referred to as the lower stop (not shown), or until the torque generated by gravity becomes smaller than the resistive torques again.

In practice, if the angle alpha of the watch does not vary, only the angle Beta will change, and it will be sought for the progression of the torque generated by gravity to increase faster than that of the spring (by judiciously choosing the various parameters of the mass and of the spring). In this way, once the mass starts to move, the torque only increases with the displacement of the oscillating mass 10 and the transfer from the first to the second of the extreme positions occurs continuously, without passing through a stable intermediate position (without modifying the angle of the watch), and the mass is therefore bi-stable. The magnetic element is likewise in a second stable position. In this second position, it can be visible to the wearer.

As long as the angle of the watch remains unchanged, the system remains in equilibrium with the oscillating mass 10 in its second stable position. However, the equation of the torques has changed, since the sign of the resistive torque of the function has now changed (to transfer the function this time from a started state to a stopped state, the mass must revolve in the counter-clockwise direction).

We have:

$$C=d*m*\text{gravity}*\text{sine(alpha)}*\text{cosine(beta)}-K*(\text{Theta0}+\text{Beta0}-\text{Beta})+\text{Cresistif}$$

While this torque is positive, the oscillating mass 10 tends to turn in the clockwise direction and therefore remains in abutment, in the second stable position.

This torque becomes negative when sine (Alpha) becomes smaller than (beta=betaF):

$$\text{sine(alphaF)}<(K*(\text{Theta0}+\text{Beta0}-\text{BetaF})-\text{Cresistif})/(d*m*\text{gravity}*\text{cosine (betaF)}).$$

The angle at which the torque becomes negative is denoted AlphaF.

Once the resultant of the torques applied to the mass has become negative, the torque generated by gravity will be smaller than the resistive torque of the function and of the return spring. The oscillating mass 10 will therefore pivot about its axis in the counter-clockwise direction (Beta will increase). The mass will move as long as it has not returned to its first extreme position or until the torque generated by gravity becomes greater than the resistive torques again.

In practice, if the angle of the watch does not vary, only e will change, and it will be sought for the progression of the torque generated by gravity to decrease faster than that of the spring (by judiciously choosing the various parameters of the mass and of the spring). In this way, once the mass starts to move, the torque only decreases with the displacement of the mass and the transfer from the second to the first of the extreme positions occurs continuously, without passing through a stable intermediate position (without modifying the angle of the watch), and the mass is therefore indeed bi-stable.

It will be noted that, in the case of a visual animation, the concepts of stopping and starting the function must be understood broadly, as corresponding to a first and a second state of the visual animation. For what it is worth, it is possible to use the term "command system" as an equivalent for the term "stopping and starting system".

Similarly to the visual animation driven by a barrel, the function may also be a striking mechanism, the triggering of which can be taken up by an hour-striking mechanism. The barrel is released or blocked as per the positioning of the mass, when it is respectively in its first extreme position or in its second extreme position.

In the two examples mentioned implementing a barrel, this is rewound by a rewinding mechanism, either specifically or via the rewinding of the main barrel of the movement. This rewinding can be manual or automatic. It is likewise possible to power the animation or striking mechanism via the barrel of the movement, by using a barrel suitable for supplying energy via two power take-offs.

Via a kinematic connection of meshing type (pinion or rack), it is also possible to move wheels or pinion, such as for example a set of shuttles or a column wheel of a chronograph, by way of a chronograph control member. The zeroing phase can advantageously be effected by a pushbutton acting separately on the control member and on conventional zeroing elements (hammers, . . . ).

A kinematic connection with the unbalanced mass can likewise displace at least one movable shutter on or below the main dial, a sub-dial or part of a dial, to modify the appearance of the watch or to allow particular displays to be seen. Polarized glasses can be used and displaced via this or these movable shutter(s).

Such shutters may also be displaced by releasing a barrel, similar to that as has been described above.

Thus, the system according to the invention makes it possible to command a function by starting and stopping it, or by commanding its transfer from a first state to a second state, and vice versa, when the watch is respectively in a first and a second spatial orientation. These particular spatial orientations correspond to the first and second extreme positions of a mass. These positions are determined and, by virtue of the bi-stable nature of the displacement of the mass, the transfer from one state to another of the function is precise, corresponding to a specific spatial orientation.

The person skilled in the art can adapt the description above without departing from the scope of the invention defined in the claims. They can define the start and stop orientations, the types, forces and preloading of the spring, and the connection between the mass and the control system.

The invention claimed is:

1. Mechanical system for stopping and starting a function of a timepiece, comprising a mass, movably mounted on a frame between a first and a second extreme position, defined respectively by a first and a second stop, said mass being displaced, under the effect of gravity, thereby loading of a spring between the first and second extreme positions, and thereby relaxing said spring between the second and first extreme positions, said mass being kinematically or directly connected to a control member for said function, the mass and a force of the spring being determined as a function of the force required to command said function and displace the control member, and of predetermined spatial orientations of the frame, in which the mass is bi-stably displaced from one to the other of its extreme positions, according to a resultant of the forces exerted by the spring and by gravity, the displacement of the mass from the first extreme position to the second extreme position being able to start said function via the control member, and the displacement of the mass from the second extreme position to the first extreme position being able to stop said function via the control member.

2. System according to claim 1, wherein the mass is mounted movably in rotation and is unbalanced.

3. System according to claim 1, wherein the mass is connected to a speed regulator.

4. System according to claim 3, wherein the speed regulator is an escapement, an inertia brake, or a viscous-friction device in a bath.

5. System according to claim 1, comprising a device for blocking the mass.

6. System according to claim 1, wherein the control member bears a magnet.

7. System according to claim 1, wherein the spring is calculated such that orientations of the frame triggering respectively the starting and stopping of the function, are different.

8. System according to claim 1, wherein elements that implement said function are mounted on the frame.

9. Watch having a system according to claim 1 and a mechanism that implements said function, wherein said mass is transferred from its first extreme position to its second extreme position, and from its second extreme position to its first extreme position, when the watch is brought respectively into a first spatial orientation or a second spatial orientation.

10. Watch according to claim 9, wherein the first and the second spatial orientation are similar.

11. Watch according to claim 9, wherein the first and the second spatial orientation are different.

12. Watch according to claim 11, wherein, in the first orientation, the watch has an angle alpha of between 3° and 35°, Beta=0°, Gamma=0° and, in the second orientation, the watch has an angle alpha of between 15 and 18°, Beta=0°, Gamma=0°, the angle alpha being the angle of rotation of the watch about an axis passing through the positions 9H and 3H of a dial, alpha being equal to 0 when the dial is horizontal, the angle beta being the angle of rotation about the axis 12H-6H, and the axis gamma being the angle of rotation about the orthogonal axis passing through a center of the dial.

13. Watch according to claim 9, wherein the system comprises a device for blocking the mass which is accessible from a outside of the watch.

14. Watch according to claim 9, wherein the mechanism is chosen from among a chronograph mechanism, a striking mechanism, a visual animation mechanism.

* * * * *